United States Patent
Wang

(10) Patent No.: US 8,626,085 B2
(45) Date of Patent: Jan. 7, 2014

(54) DUAL MODE MOBILE TERMINAL SYSTEM

(75) Inventor: Xiao-Dong Wang, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 387 days.

(21) Appl. No.: 12/979,360

(22) Filed: Dec. 28, 2010

(65) Prior Publication Data

US 2012/0135782 A1 May 31, 2012

(30) Foreign Application Priority Data

Nov. 26, 2010 (CN) .......................... 2010 1 0561055

(51) Int. Cl.
*H04B 1/44* (2006.01)
(52) U.S. Cl.
USPC ...................... 455/78; 455/552.1; 455/553.1
(58) Field of Classification Search
USPC ................... 455/552.1, 553.1, 73, 78
See application file for complete search history.

(56) References Cited

U.S. PATENT DOCUMENTS

| | | | | | |
|---|---|---|---|---|---|
| 6,091,966 | A | * | 7/2000 | Meadows | 455/553.1 |
| 6,151,509 | A | * | 11/2000 | Chorey | 455/552.1 |
| 6,163,709 | A | * | 12/2000 | Chorey et al. | 455/552.1 |
| 6,298,244 | B1 | * | 10/2001 | Boesch et al. | 455/553.1 |
| 6,510,310 | B1 | * | 1/2003 | Muralidharan | 455/83 |
| 6,928,298 | B2 | * | 8/2005 | Furutani et al. | 455/553.1 |
| 6,952,594 | B2 | * | 10/2005 | Hendin | 455/552.1 |
| 6,990,357 | B2 | * | 1/2006 | Ella et al. | 455/553.1 |
| 7,062,249 | B2 | * | 6/2006 | Park et al. | 455/335 |
| 7,103,312 | B2 | * | 9/2006 | Judd et al. | 455/20 |
| 7,120,394 | B2 | * | 10/2006 | Suzuki et al. | 455/83 |
| 7,155,252 | B2 | * | 12/2006 | Martin et al. | 455/553.1 |
| 7,167,688 | B2 | * | 1/2007 | Li et al. | 455/88 |
| 7,187,945 | B2 | * | 3/2007 | Ranta et al. | 455/552.1 |
| 7,376,440 | B2 | * | 5/2008 | Forrester et al. | 455/553.1 |
| 7,420,438 | B2 | * | 9/2008 | Nakai et al. | 333/133 |
| 7,773,956 | B2 | * | 8/2010 | Fukamachi et al. | 455/78 |
| 7,917,170 | B2 | * | 3/2011 | Zhitnitsky | 455/552.1 |
| 8,260,347 | B2 | * | 9/2012 | Tang et al. | 455/553.1 |
| 8,290,536 | B2 | * | 10/2012 | Kenington et al. | 455/553.1 |
| 8,315,577 | B2 | * | 11/2012 | Kemmochi et al. | 455/78 |
| 2002/0137471 | A1 | * | 9/2002 | Satoh et al. | 455/83 |
| 2003/0199271 | A1 | * | 10/2003 | Watanabe et al. | 455/424 |
| 2004/0147230 | A1 | * | 7/2004 | Nast et al. | 455/78 |
| 2004/0152426 | A1 | * | 8/2004 | Suzuki et al. | 455/83 |
| 2004/0198237 | A1 | * | 10/2004 | Abutaleb et al. | 455/78 |
| 2005/0032548 | A1 | * | 2/2005 | Frank | 455/552.1 |
| 2005/0245201 | A1 | * | 11/2005 | Ella et al. | 455/78 |
| 2006/0223577 | A1 | * | 10/2006 | Ouzillou | 455/553.1 |
| 2008/0166980 | A1 | * | 7/2008 | Fukamachi et al. | 455/83 |

(Continued)

*Primary Examiner* — Lewis West
(74) *Attorney, Agent, or Firm* — Altis Law Group, Inc.

(57) ABSTRACT

A dual mode mobile terminal system includes an antenna, a diplexer, a first communication module, a first power amplifier, and a second communication module. The diplexer receives and transmits a first wireless signal, and isolates the receiving path and the transmitting path of the first wireless signal. The second communication module receives a second wireless signal from the switch. The first power amplifier amplifies the second wireless signal. The antenna is selectably connected to the diplexer or the first power amplifier through the switch. The antenna, the switch, the diplexer, and the first communication module form a first signal transmission path to transmit and receive the first wireless signal; the antenna, the switch, the first power amplifier, and the second communication module form a second signal transmission path to transmit and receive the second wireless signal.

14 Claims, 1 Drawing Sheet

(56) References Cited

U.S. PATENT DOCUMENTS

| | | | |
|---|---|---|---|
| 2009/0017772 A1* | 1/2009 | Kemmochi et al. | 455/73 |
| 2009/0093270 A1* | 4/2009 | Block et al. | 455/552.1 |
| 2009/0207764 A1* | 8/2009 | Fukamachi et al. | 370/297 |
| 2009/0233642 A1* | 9/2009 | Zhitnitsky | 455/552.1 |
| 2010/0277252 A1* | 11/2010 | Gorbachov | 333/104 |

* cited by examiner

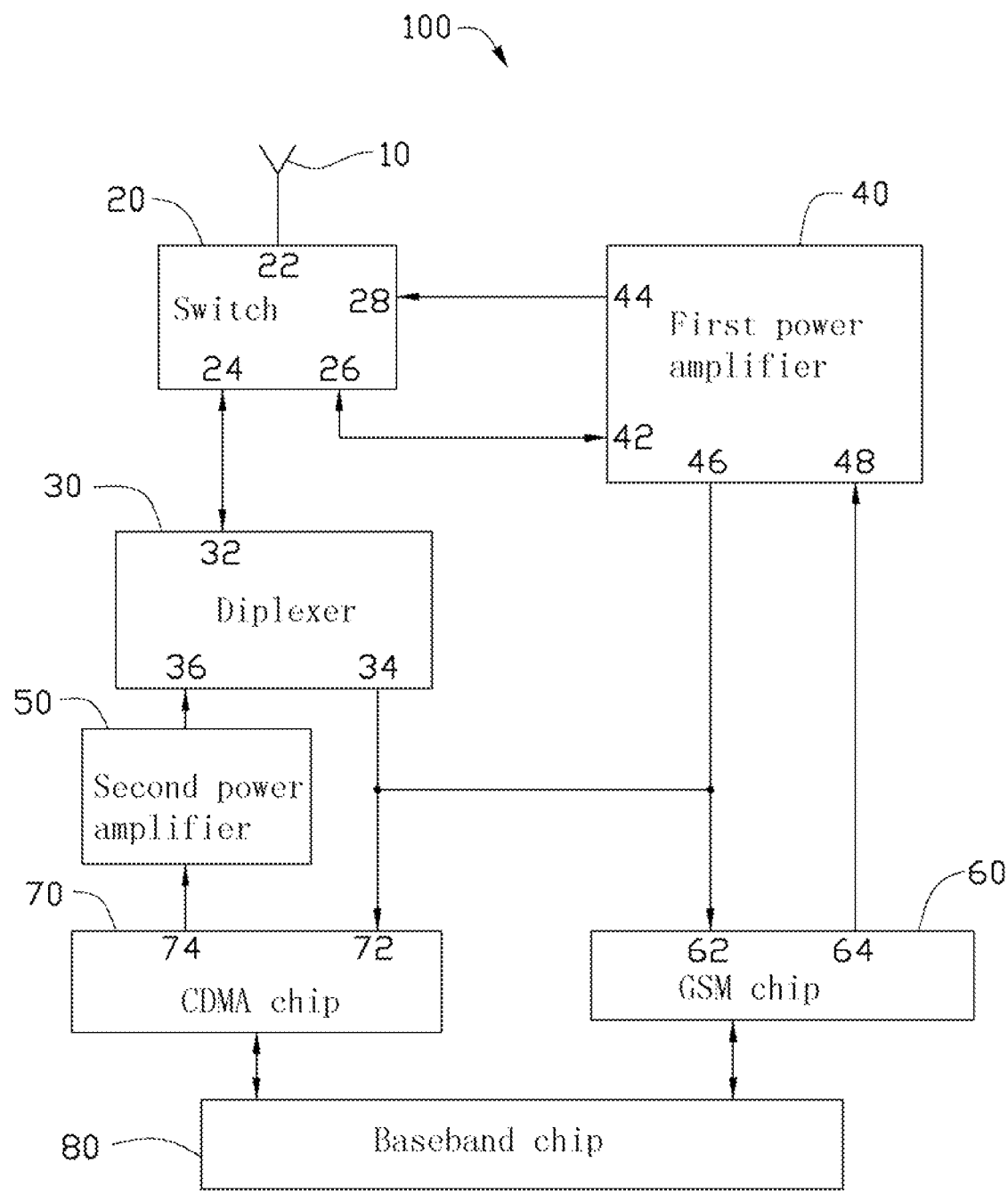

DUAL MODE MOBILE TERMINAL SYSTEM

BACKGROUND

1. Technical Field

The disclosure generally relates to mobile terminal systems, and more particularly relates to, a dual mode mobile terminal system.

2. Description of the Related Art

Dual mode mobile terminals typically employ two different network standards, such as code division multiple access (CDMA) network and global system for mobile (GSM) network. A CDMA antenna is employed in the dual mode mobile terminal to receive and transmit CDMA signals, and a GSM antenna is employed in the dual mode mobile terminal to receive and transmit GSM signals.

The CDMA antenna and the GSM antenna need to be separately placed in a relatively far distance to obtain high isolation and avoid mutual interference when transmitting CDMA signals and GSM signals. However, in design, the CDMA antenna and the GSM antenna need a large design space in the dual mode mobile terminal, so that it is not conducive to the miniaturization of the mobile terminal, while making the circuit more complex and increasing the design cost.

Therefore, there is room for improvement within the art.

BRIEF DESCRIPTION OF THE DRAWINGS

Many aspects of an exemplary dual mode mobile terminal system can be better understood with reference to the following drawings. The components in the drawings are not necessarily drawn to scale, the emphasis instead being placed upon clearly illustrating the principles of the exemplary dual mode mobile terminal system. Moreover, in the drawings, like reference numerals designate corresponding parts throughout the several views. Wherever possible, the same reference numbers are used throughout the drawings to refer to the same or like elements of an embodiment.

The drawing is a block view of a dual mode mobile terminal system, according to an exemplary embodiment.

DETAILED DESCRIPTION

The drawing shows an exemplary embodiment of a dual mode mobile terminal system 100, which can be used in various wireless communication devices, such as dual mode dual standby mobile phones. The dual mode mobile terminal system 100 includes an antenna 10, a switch 20, a diplexer 30, a first power amplifier 40, a second power amplifier 50, a first communication module, a second communication module, and a baseband chip 80. The communication modules can be can globe system for mobile (GSM) chips, code division multiple assess (CDMA) chips, wideband CDMA (WCDMA) chips, or time division-synchronous code division multiple access (TD-SCDMA) chips. In this exemplary embodiment, the first communication module is a CDMA 70, and the second communication module chip is a GSM chip 60.

The antenna 10 is capable of receiving and transmitting wireless signals, such as CDMA signals, GSM signals. In this exemplary embodiment, the antenna 10 can be a dual mode antenna to receive and transmit the wireless signals, which frequency bands are 850 MHz, 900 MHz, 1800 MHz, 1900 MHz, or 1940-1955 MHz.

The switch 20 can be an analog switch and includes an antenna port 22, a first signal transceiving port 24, a second transceiving port 26, and a signal control port 28. The antenna port 22 is electrically connected to the antenna 10 to communicate wireless signals with the antenna 10. The first signal transceiving port 24 is electrically connected to the diplexer 30 to transmit and receive the CDMA signals. The second signal transceiving port 26 is electrically connected to the first power amplifier 40 to transmit and receive the GSM signals.

In this exemplary embodiment, the antenna port 22 is electrically connected to the first signal transceiving port 24 to receive and transmit the CDMA signals. The signal control port 28 is electrically connected to the first power amplifier 40 to receive a command signal to control the antenna port 22 to selectably connect the first transceiving port 24 or the second transceiving port 26. For example, when the signal control port 28 receives a logical 1 command signal from the first power amplifier 40, the antenna port 22 is switched to connect the second transceiving port 26 to receive and transmit the GSM signals.

The diplexer 30 is capable of isolating the receiving path and the transmission path of the CDMA signals and includes an antenna signal interface 32, a signal receiver port 34 and a signal transmitter port 36. The antenna signal interface 32 is electrically connected to the first transceiving port 24 to receive and transmit CDMA signals. The signal receiver port 34 is electrically connected to the CDMA chip 70; the signal transmitter port 36 is electrically connected to the second power amplifier 50. The signal receiver port 34 and the signal transmitter port 36 are isolated from each other to respectively receive CDMA signals from the antenna signal interface 32 and send CDMA signals to the antenna signal interface 32, which is enabled to avoid signal interference.

The second power amplifier 50 can be a linear amplifier and is electrically connected to the signal transmitter port 36 of the diplexer 30 and the CDMA chip 70. The second power amplifier 50 amplifies the CDMA signals from the CDMA chip 70, which are then transmitted to the diplexer 30.

The CDMA chip 70 is electrically connected to the baseband chip 80 and includes a signal receiving pin 72 and a signal transmitting pin 74. The signal receiving pin 72 is electrically connected to the signal receiver port 34 of the diplexer 30 to receive the CDMA signals, the received CDMA signals are modulated and then are transmitted to the baseband chip 80. The CDMA chip 70 is further capable of demodulating baseband signals from the baseband chip 80 into corresponding CDMA signals, and then sending the CDMA signals to the second power amplifier 50.

The first power amplifier 40 can be a non-linear amplifier and can be integrated with an antenna switch module (ASM). The first power amplifier 40 is electrically connected between the switch 20 and the GSM chip 60 to amplify the GSM signals from the GSM chip 60. The first power amplifier 40 includes an antenna signal pin 42, a signal control pin 44, a signal output pin 46, and a signal input pin 48. The antenna signal pin 42 is electrically connected to the second transceiving port 26 to receive and send the GSM signals. The signal control pin 44 is electrically connected to the signal control port 28 to provide a command signal. For example, when the signal control pin 44 outputs and provides a logical 1 command signal for the signal control port 28, the antenna port 22 is then switched from the first transceiving port 24 to the second transceiving port 26, therefore, the dual mode mobile terminal system 100 is switched from a CDMA standard to a GSM standard.

The GSM chip 60 is electrically connected to the baseband chip 80 and includes a signal receiving pin 62 and a signal transmitting pin 64 electrically connected to the signal input pin 48. The signal receiving pin 62 is electrically connected to the signal output pin 46 to receive the GSM signals, the received GSM signals are modulated and then are transmitted to the baseband chip 80. The GSM chip 60 is further capable of demodulating baseband signals from the baseband chip 80 into corresponding GSM signals and sending the GSM signals to the signal input pin 48 of the first power amplifier 40 to amplify the GSM signals.

The baseband chip 80 is electrically connected to the GSM chip 60 and the CDMA chip 70 to respectively receive the baseband signals. The baseband chip 80 is capable of decoding the baseband signals into corresponding audio signals, and is further capable of compiling or synthesizing audio signals into corresponding baseband signals, providing for the GSM chip 60 and the CDMA chip 70.

In this exemplary embodiment, since the signal receiver port 34 of the diplexer 30, the signal output pin 46 of the first power amplifier 40, the signal receiving pin 62 of the GSM chip 60 and the signal receiving pin 72 of the CDMA chip 70 are electrically connected to each other, whatever the antenna port 22 of the switch 20 is switched to connect the diplexer 30 or the first power amplifier 40, the GSM chip 60 and the CDMA chip 70 are electrically connected to the antenna 10. Thus, the dual mode mobile terminal system 100 support GSM network standard and CDMA network standard and can switch to different operation modes to achieve dual-mode function.

Further referring to FIG. 1, in use, when the dual mode mobile terminal system 100 works in CDMA network, the antenna port 22 is electrically connected to the first signal transceiving port 24 of the switch 20 to receive and transmit the CDMA signals. The antenna 10, the switch 20, the diplexer 30, the second power amplifier 50, the CDMA chip 70, and the baseband chip 80 form a first signal transmission path. The baseband chip 80 converts audio signals into corresponding baseband signals, the baseband signals are modulated by the CDMA chip 70 to generate corresponding CDMA signals. The CDMA signals are amplified by the second power amplifier 50, and then are transmitted by the antenna 10 though the diplexer 30 and the switch 20. Due to the signal isolation function of the diplexer 30, the received wireless signals and the transmitted wireless signals are isolated from each other to avoid interference.

When the dual mode mobile terminal system 100 works in GSM network, the antenna port 22 is switched to electrically connect the second signal transceiving port 26 of the switch 20 to receive and transmit the GSM signals. The antenna 10, the switch 20, the first power amplifier 40, the GSM chip 70, and the baseband chip 80 form a second signal transmission path. Because the GSM signals are directly transmitted along the second signal transmission path, and the second signal transmission path is isolated with the first signal transmission path, which is enabled to avoid interference.

In addition, the dual mode mobile terminal system 100 can also be used in other communication network standards, such as WCDMA network, and TD-CDMA network. Moreover, the second power amplifier 50 can be integrated with the CDMA chip 70 therein.

In summary, in the dual mode mobile terminal system 100 of the exemplary embodiment, the first (CDMA) signal transmission path and the second (GSM) signal transmission path share the antenna 10 to receive and transmit wireless signals, reducing design space and cost. The signal receiver port 34 of the diplexer 30, the signal output pin 46 of the first power amplifier 40, the signal receiving pin 62 of the GSM chip 60 and the signal receiving pin 72 of the CDMA chip 70 are electrically connected to each other, making mobile terminals to be in the dual mode state. Moreover, the CDMA signal transmission path and the GSM signal transmission path are isolated and separated from each other, avoiding interference.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A dual mode mobile terminal system, comprising:
   an antenna for receiving and transmitting wireless signals;
   a switch electrically connected to the antenna, including a signal control port;
   a diplexer electrically connected to the switch, the diplexer for receiving and transmitting a first wireless signal, and isolating the receiving path and the transmitting path of the first wireless signal;
   a first communication module electrically connected to the diplexer, the first communication module for processing the first wireless signal from the diplexer;
   a second communication module electrically connected to the switch, the second communication module for receiving a second wireless signal from the switch; and
   a first power amplifier electrically connected to the switch and the second communication module, the first power amplifier for receiving and amplifying the second wireless signal, the first power amplifier including a signal control pin, a signal output pin, and a signal input pin;
   wherein the antenna is selectably connected to the diplexer or the first power amplifier through the switch, the antenna, the switch, the diplexer, and the first communication module form a first signal transmission path to transmit and receive the first wireless signal; the antenna, the switch, the first power amplifier, and the second communication module form a second signal transmission path to transmit and receive the second wireless signal;
   the signal control pin is electrically connected to the signal control port to provide an enabled command signal to control the antenna switch from the diplexer to the first power amplifier; the signal output pin and the signal input pin are electrically connected to the second communication module to transmit and receive the second wireless signal;
   the switch comprises an antenna port, a first signal transceiving port, and a second transceiving port, the antenna port is electrically connected to the antenna to communicate wireless signals with the antenna, the first signal transceiving port is electrically connected to the diplexer to transmit and receive the first wireless signal, and the second signal transceiving port is electrically connected to the first power amplifier to transmit and receive the second wireless signal;
   the first power amplifier comprises an antenna signal pin, the antenna signal pin is electrically connected to the second transceiving port to receive and send the second wireless signal;
   the second communication module comprises a signal receiving pin and a signal transmitting pin, the signal receiving pin is electrically connected to the signal output pin to receive the second wireless signal, the signal transmitting pin is electrically connected to the signal input pin to transmit the second wireless signal; the signal output pin and the diplexer are electrically connected to each other.

2. The dual mode mobile terminal system as claimed in claim 1, wherein when the signal control pin provides an enabled command signal for the signal control port, the antenna port is switched from the first transceiving port to the second transceiving port, and the first signal transmission path is switched to the second signal transmission path.

3. The dual mode mobile terminal system as claimed in claim 1, wherein the second communication module modulates the second wireless signal from the first power amplifier, and demodulating baseband signal into corresponding second wireless signal.

4. The dual mode mobile terminal system as claimed in claim 1, further comprising a second power amplifier, wherein the second power amplifier is electrically connected to the diplexer and the first communication module, and the second power amplifier amplifies the first wireless signal from the first communication module, the amplified first wireless signal is transmitted to the diplexer.

5. The dual mode mobile terminal system as claimed in claim 1, further comprising a second power amplifier, wherein the diplexer comprises an antenna signal interface, a signal receiver port and a signal transmitter port, the antenna signal interface is electrically connected to the first transceiving port to receive and transmit the first wireless signal, the signal receiver port is electrically connected to the first communication module, the signal transmitter port is electrically connected to the second power amplifier.

6. The dual mode mobile terminal system as claimed in claim 5, wherein the signal receiver port and the signal transmitter port are isolated from each other to respectively receive the first wireless signal from the antenna signal interface and send the first wireless signal to the antenna signal interface to avoid signal interference.

7. The dual mode mobile terminal system as claimed in claim 4 or 5, wherein the first power amplifier is a non-linear amplifier, the second power amplifier is a linear amplifier.

8. The dual mode mobile terminal system as claimed in claim 1, further comprising a baseband chip electrically connected to the second communication module and the first communication module, wherein the baseband chip receives baseband signals, decodes the baseband signals into corresponding audio signals, or compiles audio signals into corresponding baseband signals for the second communication module and the first communication module.

9. A dual mode mobile terminal system, comprising:
an antenna for receiving and transmitting wireless signals;
a switch electrically connected to the antenna and forming two different signal transmission paths, and including a signal control port;
a diplexer electrically connected to the switch, the diplexer for receiving and transmitting a first wireless signal, and isolating the receiving path and the transmitting path of the first wireless signal;
a first communication module electrically connected to the diplexer, the first communication module for processing the first wireless signal from the diplexer to generate a corresponding baseband signal;
a second communication module electrically connected to the switch, the second communication module for receiving a second wireless signal from the switch to generate a corresponding baseband signal; and
a first power amplifier electrically connected to the switch and the second communication module, the first power amplifier that receives the second wireless signal from the switch and amplifies the second wireless signal from the second communication module, the first power amplifier including a signal control pin, a signal output pin, and a signal input pin;
wherein the diplexer, the first power amplifier, the first communication module and the first communication module are electrically connected to each other, the antenna is selectably and electrically connected to the diplexer or the first power amplifier through the switch, when the antenna is electrically connected to the diplexer, the antenna, the switch, the diplexer, and the first communication module form a first signal transmission path to transmit and receive the first wireless signal; when the antenna is electrically connected to the first power amplifier, the antenna, the switch, the first power amplifier, and the second communication module form a second signal transmission path to transmit and receive the second wireless signal;
the signal control pin is electrically connected to the signal control port to provide an enabled command signal to control the antenna switch from the diplexer to the first power amplifier; the signal output pin and the signal input pin are electrically connected to the second communication module to transmit and receive the second wireless signal;
the switch comprises an antenna port, a first signal transceiving port, and a second transceiving port, the antenna port is electrically connected to the antenna to communicate wireless signals with the antenna, the first signal transceiving port is electrically connected to the diplexer to transmit and receive the first wireless signal, and the second signal transceiving port is electrically connected to the first power amplifier to transmit and receive the second wireless signal;
the first power amplifier comprises an antenna signal pin, the antenna signal pin is electrically connected to the second transceiving port to receive and send the second wireless signal;
the second communication module comprises a signal receiving pin and a signal transmitting pin, the signal receiving pin is electrically connected to the signal output pin to receive the second wireless signal, the signal transmitting pin is electrically connected to the signal input pin to transmit the second wireless signal, the signal output pin and the diplexer are electrically connected to each other.

10. The dual mode mobile terminal system as claimed in claim 9, wherein when the signal control pin provides an enabled command signal for the signal control port, the antenna port is switched from the first transceiving port to the second transceiving port, and the first signal transmission path is switched to the second signal transmission path.

11. The dual mode mobile terminal system as claimed in claim 9, wherein the second communication module modulates the second wireless signal from the first power amplifier, and demodulating baseband signal into corresponding second wireless signal.

12. The dual mode mobile terminal system as claimed in claim 9, further comprising a second power amplifier amplifying the first wireless signal from the first communication module, wherein the diplexer comprises an antenna signal interface, a signal receiver port and a signal transmitter port, the antenna signal interface is electrically connected to the first transceiving port to receive and transmit the first wireless signal, the signal receiver port is electrically connected to the first communication module, the signal transmitter port is electrically connected to the second power amplifier.

13. The dual mode mobile terminal system as claimed in claim 12, wherein the signal receiver port and the signal transmitter port are isolated from each other to respectively receive the first wireless signal from the antenna signal interface and send the first wireless signal to the antenna signal interface to avoid signal interference.

14. The dual mode mobile terminal system as claimed in claim 9, further comprising a baseband chip electrically connected to the second wireless communication module and the first communication module, wherein the baseband chip receives baseband signals, decoding the baseband signals into corresponding audio signals, or compiling audio signals into corresponding baseband signals for the second communication module and the first communication module.

* * * * *